R. ALDEN.
Tree-Protector.
No. 46,616. Patented Mar. 7, 1865.
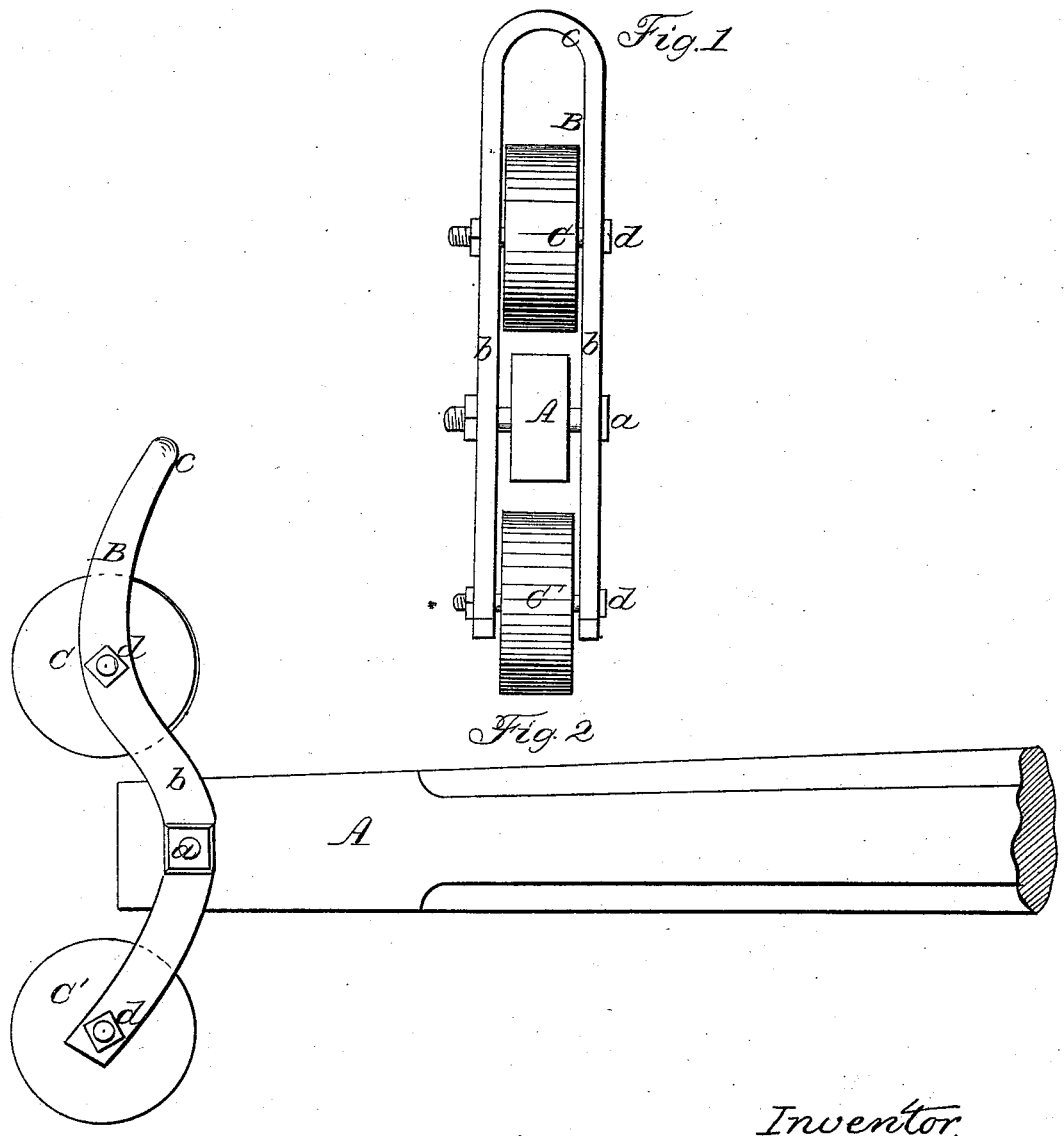

UNITED STATES PATENT OFFICE.

RUEL ALDEN, OF EAST TOLEDO, OHIO.

PROTECTING TREES FROM INJURY WHILE PLOWING.

Specification forming part of Letters Patent No. 46,616, dated March 7, 1865.

*To all whom it may concern:*

Be it known that I, RUEL ALDEN, of East Toledo, in the county of Lucas and State of Ohio, have invented a new and Improved Means for Preventing Injury to Trees while Plowing; and I do hereby declare that the following is a full, clear, and exact description thereof, which will enable others skilled in the art to make and use the same, reference being had to the accompanying drawings, forming part of this specification, in which—

Figure 1 is an end view of my invention applied to a whiffletree. Fig. 2 is a plan or top view of the same.

Similar letters of reference indicate like parts.

This invention relates to a new and useful attachment to be applied to whiffletrees in plowing, in order to prevent the latter abrading trees—a contingency which always attends the plowing of grounds in orchards, especially young orchards, as the plow approaches the trees sufficiently near, or should, if the ground be properly plowed, to cause the whiffletrees to come in contact with the trees.

A represents a portion of a whiffletree, and B represents a metal loop, which is secured to the whiffletrees near one end by a bolt, *a*, on which it is allowed to turn freely, the loop projecting both at the front and rear of the whiffletree, as shown clearly in Fig. 2. The loop B may be constructed of a single bar, doubled or bent so as to have two parallel sides, *b b*, of equal length, disconnected at their ends at the rear of the whiffletree, while the front rounded part, *c*, at the bend in front of the whiffletree receives the hook of the trace. Within this loop B, or between the sides *b b* thereof, there are placed two rollers, C C', which may be of india-rubber or other suitable elastic material. The rollers may not be entirely constructed of this substance—an elastic or yielding material placed on a hard roller as a covering will answer the purpose. The rollers C C' are allowed to turn freely on pins *d d*, and one roller, C, is at the front side of the whiffletree, and the other, C', behind it, the sides *b b* of the loop being slightly curved, so that the rollers C C' will extend beyond the end of the whiffletree. (See Fig. 2.) By this simple device it will be seen that the end of the whiffletree is not allowed to come in contact with a tree, for the forward roller, C, will first strike the tree and then the rear one, C'.

The loop B may be made of wrought or malleable cast-iron.

Having thus described my invention, I claim as new and desire to secure by Letters Patent—

The employment or use of india-rubber or other elastic substance, in the form of rollers or otherwise, applied to one or both ends of a whiffletree to serve as a cushion or guard to protect, while plowing, trees from the action of the whiffletree, substantially as set forth.

RUEL ALDEN.

Witnesses:
M. M. LIVINGSTON,
C. L. TOPLIFF.